(12) United States Patent
Sinnarajah et al.

(10) Patent No.: US 7,328,022 B2
(45) Date of Patent: Feb. 5, 2008

(54) METHOD AND APPARATUS TO INITIATE POINT-TO-POINT CALL DURING SHARED-CHANNEL DELIVERY OF BROADCAST CONTENT IN A WIRELESS TELEPHONE NETWORK

(75) Inventors: Ragulan Sinnarajah, Ontario (CA); Jun Wang, San Diego, CA (US); Tao Chen, San Diego, CA (US)

(73) Assignee: QUALCOLMM, Incorporated, San Diego, CA (US)

( * ) Notice: Subject to any disclaimer, the term of this patent is extended or adjusted under 35 U.S.C. 154(b) by 0 days.

(21) Appl. No.: 11/436,498

(22) Filed: May 17, 2006

(65) Prior Publication Data

US 2006/0211445 A1     Sep. 21, 2006

Related U.S. Application Data

(63) Continuation of application No. 10/356,053, filed on Jan. 31, 2003, now Pat. No. 7,096,024.

(51) Int. Cl.
*H04Q 7/20* (2006.01)
(52) U.S. Cl. ...................... 455/445; 455/454
(58) Field of Classification Search ........... 455/445, 455/453, 454, 550.1, 412.2, 403, 463; 370/351, 370/356–360
See application file for complete search history.

(56) References Cited

U.S. PATENT DOCUMENTS

| 5,111,866 | A * | 5/1992 | Prostko ...................... 160/90 |
| 5,603,081 | A * | 2/1997 | Raith et al. .............. 455/435.3 |
| 5,983,099 | A * | 11/1999 | Yao et al. ................ 455/426.1 |
| 6,430,395 | B2 * | 8/2002 | Arazi et al. ................ 455/41.2 |
| 6,466,552 | B1 * | 10/2002 | Haumont .................... 370/310 |
| 6,845,236 | B2 * | 1/2005 | Chang .................... 455/414.1 |
| 6,928,294 | B2 * | 8/2005 | Maggenti et al. ........... 455/518 |
| 7,180,879 | B2 * | 2/2007 | Sinnarajah et al. ......... 370/335 |
| 2001/0030952 | A1 * | 10/2001 | Roy .......................... 370/329 |

* cited by examiner

*Primary Examiner*—CongVan Tran
(74) *Attorney, Agent, or Firm*—Roberta A. Young; Tom Rouse

(57) ABSTRACT

A method for managing a point-to-point call initiated (702) between a wireless mobile station (114, 400) and a remote party while the mobile is receiving broadcast content via one or more multi-user forward-link broadcast channels (508). The mobile station notifies (704) the network (110) of preferences as to prescribed categories of operating conditions, such as whether to continue receiving the broadcast content, and election between the point-to-point call and the broadcast content should network resources be unable to conduct the point-to-point call and broadcast content concurrently. In accordance with the preferences, communications are conducted (706) in one of the following operating modes: (1) conducting the point-to-point call and discontinuing reception of the broadcast, (2) conducting the point-to-point call and continuing reception of the broadcast, (3) aborting completion of the point-to-point call and continuing reception of the broadcast.

4 Claims, 10 Drawing Sheets

MOBILE OPERATIONS, OUTGOING CALL

IDLE MESSAGING

ACCESS MESSAGING

TRAFFIC MESSAGING

EXEMPLARY BROADCAST SYSTEM PARAMETERS MESSAGE (BSPM)

| PROGRAM | AVAILABLE ON INDIVIDUAL CHANNEL ? | AVAILABLE ON SHARED CHANNEL ? | SHARED CHANNEL CHARACTERISTICS | SHARED CHANNEL IDENTITY | TRANSMITTING NOW ON SHARED ? |
|---|---|---|---|---|---|
| CNN | YES | YES | WALSH CODE = X, MODULATION = Y, DATA RATE = Z ... | CH. 1 | YES |
| ESPN | NO | NO | ... | CH. 2 | NO |
| WEATHER CHANNEL | YES | YES | ... | CH. 3 | NO |
| WGN | NO | YES | ... | CH. 4 | YES |

FIG. 6

OVERALL SEQUENCE

MOBILE OPERATIONS,
OUTGOING CALL

MOBILE OPERATIONS, INCOMING CALL

NETWORK OPS.

METHOD AND APPARATUS TO INITIATE POINT-TO-POINT CALL DURING SHARED-CHANNEL DELIVERY OF BROADCAST CONTENT IN A WIRELESS TELEPHONE NETWORK

CLAIM OF PRIORITY UNDER 35 U.S.C. §120

The present Application for Patent is a Continuation and claims priority to patent application Ser. No. 10/356,053 entitled "Method and Apparatus to Initiate Point-to-Point Call During Shared-Channel Delivery of Broadcast Content in a Wireless Telephone Network" filed Jan. 31, 2003, now U.S. Pat. No. 7,096,024 now allowed, and assigned to the assignee hereof and hereby expressly incorporated by reference herein.

BACKGROUND

1. Field

The present invention generally relates to wireless communication networks that provide multi-user ("shared") forward-link broadcast content upon various broadcast channels. More particularly, under circumstances where a mobile station that is receiving broadcast content additionally receives or places a point-to-point call, the invention concerns operations to appropriately manage the point-to-point call and/or the broadcast connection.

2. Background

Many known communication systems transmit information signals from an origination station to a physically distinct destination station. The information signal is first converted into a form suitable for efficient transmission over the communication channel. Conversion, or modulation, of the information signal involves varying a parameter of a carrier wave in accordance with the information signal in such a way that the spectrum of the resulting modulated carrier is confined within the communication channel bandwidth. At the destination station the original information signal is replicated from the modulated carrier wave received over the communication channel. Such a replication is generally achieved by using an inverse of the modulation process employed by the origination station.

Modulation also facilitates multiple-access, that is, simultaneous transmission and/or reception, of several signals over a common communication channel. Multiple-access communication systems often include a plurality of subscriber units requiring intermittent service of relatively short duration rather than continuous access to the common communication channel. Several multiple-access techniques are known in the art, such as time division multiple-access (TDMA), frequency division multiple-access (FDMA), amplitude modulation multiple-access (AM), and code division multiple-access (CDMA) spread spectrum. Multiple-access communication systems may be wireless or wireline and may carry voice and/or data.

In a two-way, multiple-access wireless communication system, communications between users are conducted through one or more base stations. In one example, one user on a first wireless mobile station communicates with another user on a second wireless mobile station by transmitting data on a reverse link to a base station. The base station receives the data and, if necessary, routes the data to another base station. Ultimately, the data is transmitted on a forward link of the final base station to the second mobile station. "Forward" link refers to transmission from a base station to a wireless mobile station and the "reverse" link refers to transmission from a wireless mobile station to a base station. In many communication systems, the forward link and the reverse link utilize separate frequencies.

Communications can also be conducted between one user on a wireless mobile station and another user on a landline station. In this case, a base station receives the data from the mobile station on a reverse link, and routes the data through a public switched telephone network (PSTN) to the landline station. Communications also occur in the opposite direction.

The foregoing wireless communication services are examples of "point-to-point" communication service. In contrast, "broadcast" services deliver information from a central station to multiple mobile stations ("multipoint"). The basic model of a broadcast system consists of a broadcast net of users served by one or more central stations, which transmit news, movies, sports, or other "content" to the users. Here, each mobile station monitors a common broadcast forward link signal. Because the central station fixedly determines the content, the users do not generally communicate back. Examples of common usage of broadcast services communication systems are television, radio, and the like. Such communication systems are generally highly specialized.

With recent advancements in wireless telephone systems, there has been growing interest in using the existing, chiefly point-to-point wireless telephone infrastructure to additionally deliver broadcast services. In this respect, a number of important advances have been made by QUALCOMM CORPORATION of San Diego, Calif. The following references describe various QUALCOMM advances relating to the use of shared communications channels to deliver broadcast content in a wireless telephone network. U.S. Pat. No. 6,9980,820, issued Dec. 27, 2005, and entitled "METHOD AND APPARATUS FOR SIGNALLING IN BROADCAST COMMUNICATIONS SYTEM." U.S. Patent Publication No. 2004/0131075 published Jul. 8, 2004 and entitled "METHOD AND SYSTEM FOR MULTICAST SERVICE INITIATION IN A COMMUNICATION SYSTEM." U.S. Patent Publication No. 2003/0035389, published Feb. 20, 2003 and entitled "METHOD AND SYSTEM FOR UTILIZATION OF AN OUTER DECODER IN A BROADCAST SERVICES COMMUNICATIONS SYSTEM." U.S. Patent Publication No. 2003/0228861 published Dec. 11, 2003 and entitled "METHOD AND APPARATUS FOR: OVERHEAD MESSAGING IN A WIRELESS COMMUNICATION SYSTEM." U.S. Patent Publication No. 2004/0203655, published Oct. 14, 2004 and entitled "METHOD AND APPARATUS FOR COMMENCING SHARED OR INDIVIDUAL TRANSMISSION OF BROADCAST CONTENT IN A WIRELESS TELEPHONE NETWORK." U.S. Patent Publication No. 2004/0203336, published Oct. 14, 2004 and entitled "METHOD AND APPARATUS FOR SWITCHING BETWEEN SHARED AND INDIVIDUAL CHANNELS TO PROVIDE BROADCAST CONTENT SERVICES IN A WIRELESS TELEPHONE NETWORK." The foregoing references are incorporated by reference into the present disclosure.

Although the foregoing applications are satisfactory in many respects, one aspect of wireless broadcast systems that has not been fully developed is the initiation of point-to-point calls involving wireless mobile stations that are already receiving shared broadcast service.

SUMMARY

One aspect of this disclosure concerns various methods and apparatuses for managing point-to-point calls initiated between a wireless mobile station and a remote party while the wireless mobile station is receiving broadcast content via a multi-user forward-link broadcast channel, also referred to as a "shared" or "broadcast multicast service" (BCMCS) channel. The mobile station notifies the network of its preferences as to prescribed categories of operating conditions, such as: (1) whether to continue receiving the broadcast content, (2) election between the point-to-point call and the broadcast content should network resources be unable to conduct the point-to-point call and broadcast content concurrently. In accordance with the preferences, communications are conducted in one of the following modes: (1) conducting the point-to-point call and discontinuing reception of the broadcast, (2) conducting the point-to-point call and continuing reception of the broadcast, (3) aborting completion of the point-to-point call and continuing reception of the broadcast.

BRIEF DESCRIPTION OF THE DRAWINGS

FIG. 6 is a chart illustrating contents of an exemplary broadcast system parameters message (BSPM).

DETAILED DESCRIPTION

The nature, objectives, and advantages of the invention will become more apparent to those skilled in the art after considering the following detailed description in connection with the accompanying drawings.

Hardware Components & Interconnections

Wireless Communications System

Figure 1:
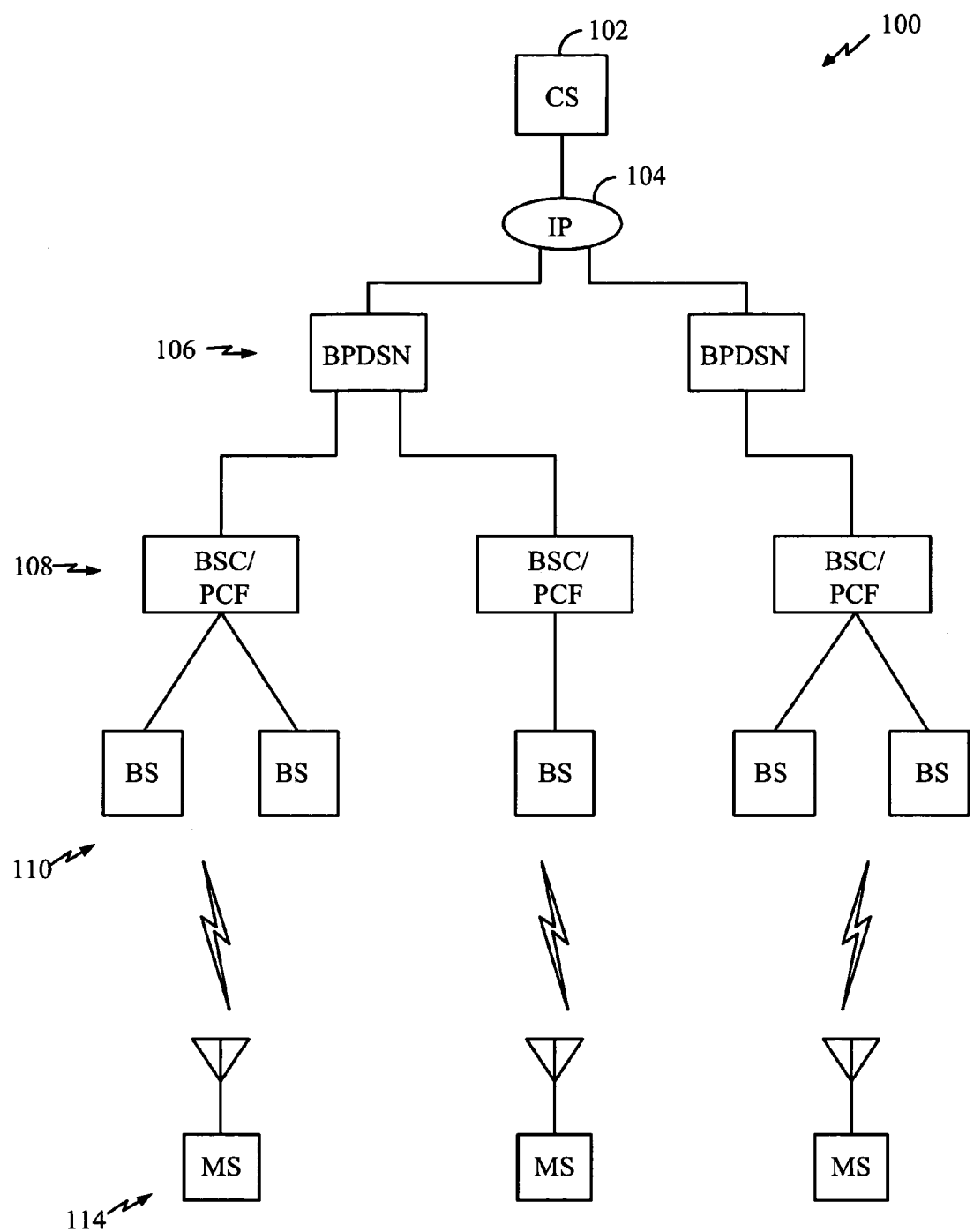
FIG. 1 is a block diagram of some hardware components and interconnections in a wireless communications network.

According to an exemplary model of a broadcast system, a number of mobile stations are served by one or more base stations that transmit broadcast content such as news, movies, sports events, and the like. FIG. 1 illustrates block diagram of a communication system 100, capable of performing high-speed broadcast service (HSBS) under various embodiments of the present disclosure.

Broadcast content originates at one or more content servers (CS) 102. The content server 102 comprises one or more digital data processing machines such as a personal computer, computer workstation, mainframe computer, computer network, microprocessor, or other computing facility to deliver packet-formatted (or other formatted) broadcast content to broadcast-packet-data-serving-nodes (BPDSN) 106 via Internet Protocol (IP) connection 104 or other (not shown) non-IP network or direct connection. Depending upon the manner of implementation, the nodes 106 may utilize the same or different hardware as packet data switching nodes (PDSNs) of the type that are well known in wireless telephony. According to each packet's destination, nodes 106 deliver the packet to an appropriate packet control function (PCF) module 108. Each module 108 controls various functions of base stations 110 related to delivery of high speed broadcast services. Among other functions, the modules 108 forward broadcast packets to the base stations 110. Each module 108 may utilize the same or different hardware as a base station controller (BSC) of the type that are well known in wireless telephony.

The base stations 110 deliver broadcast content and conventional wireless telephone calls to mobile stations (MSs) 114. The base stations 110 may be implemented using hardware such as that used by conventional base stations commercially used today.

Exemplary Digital Data Processing Apparatus

Data processing entities such as base stations, mobile stations, components 102, 106, 108, 110, 114, or any one or more of their subcomponents may be implemented in various forms. One example is a digital data processing apparatus, as exemplified by the hardware components and interconnections of the digital data processing apparatus 200 of FIG. 2.

The apparatus 200 includes a processor 202, such as a microprocessor, personal computer, workstation, controller, microcontroller, state machine, or other processing machine, coupled to a storage 204. In the present example, the storage 204 includes a fast-access storage 206, as well as nonvolatile storage 208. The fast-access storage 206 may comprise random access memory ("RAM"), and may be used to store the programming instructions executed by the processor 202. The nonvolatile storage 208 may comprise, for example, battery backup RAM, EEPROM, flash PROM, one or more magnetic data storage disks such as a "hard drive", a tape drive, or any other suitable storage device. The apparatus 200 also includes an input/output 210, such as a line, bus, cable, electromagnetic link, or other means for the processor 202 to exchange data with other hardware external to the apparatus 200.

Despite the specific foregoing description, ordinarily skilled artisans (having the benefit of this disclosure) will recognize that the apparatus discussed above may be implemented in a machine of different construction, without departing from the scope of the invention. As a specific example, one of the components 206, 208 may be eliminated; furthermore, the storage 204, 206, and/or 208 may be provided on-board the processor 202, or even provided externally to the apparatus 200.

Logic Circuitry

In contrast to the digital data processing apparatus discussed above, a different embodiment of the invention uses logic circuitry instead of computer-executed instructions to implement various processing entities such as those mentioned above. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS, TTL, VLSI, or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

Wireless Telephone

Figure 4:
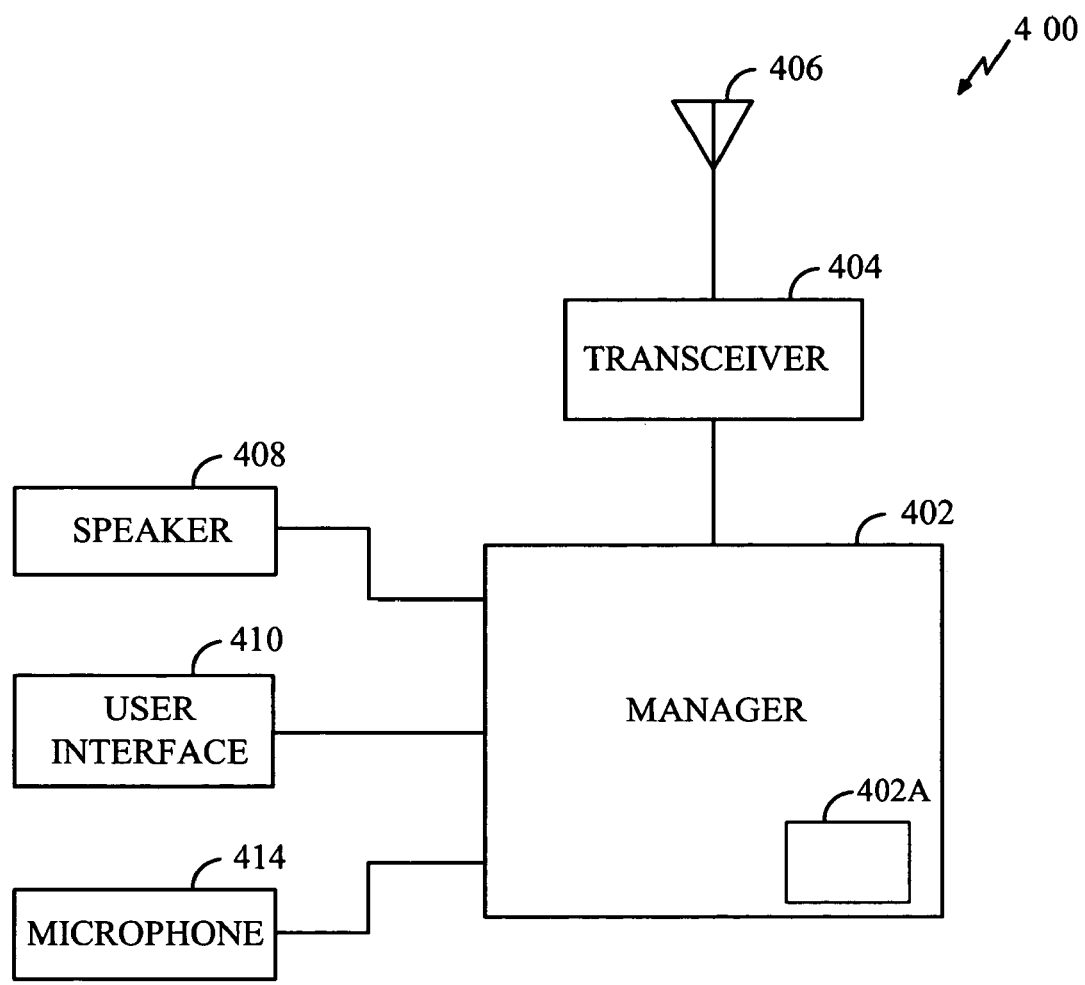
FIG. 4 is a block diagram of the hardware components and interconnections of a wireless mobile station.

FIG. 4 further illustrates the construction of an exemplary mobile station 114 by depicting a wireless telephone 400. The telephone 400 includes a speaker 408, user interface 410, microphone 414, transceiver 404, antenna 406, manager 402, along with any other conventional circuitry that may vary depending upon the application. The manager 402, which may comprise circuitry such as that discussed in conjunction with FIG. 2 (above), serves to manage operation of the components 404, 408, 410, and 414 as well as signal routing between these components.

Although the wireless telephone 400 is illustrated, mobile station 114 may be mobile or stationary. Furthermore, a mobile station may comprise any data device that communicates through a wireless channel or through a wired channel, for example using fiber optic or coaxial cables. In addition to (or instead of) wireless and wireline phones, a mobile station may be configured to implement various other devices including but not limited to PC card, compact flash, external or internal modem, etc.

Operation

Having described various structural features, some operational aspects of the present disclosure are now described. As mentioned above, one operational aspect of the present disclosure involves the management of point-to-point call and/or shared broadcast connection under circumstances where a mobile station that is receiving multicast broadcast programming additionally receives or places a point-to-point call.

Signal-Bearing Media

Figure 2:
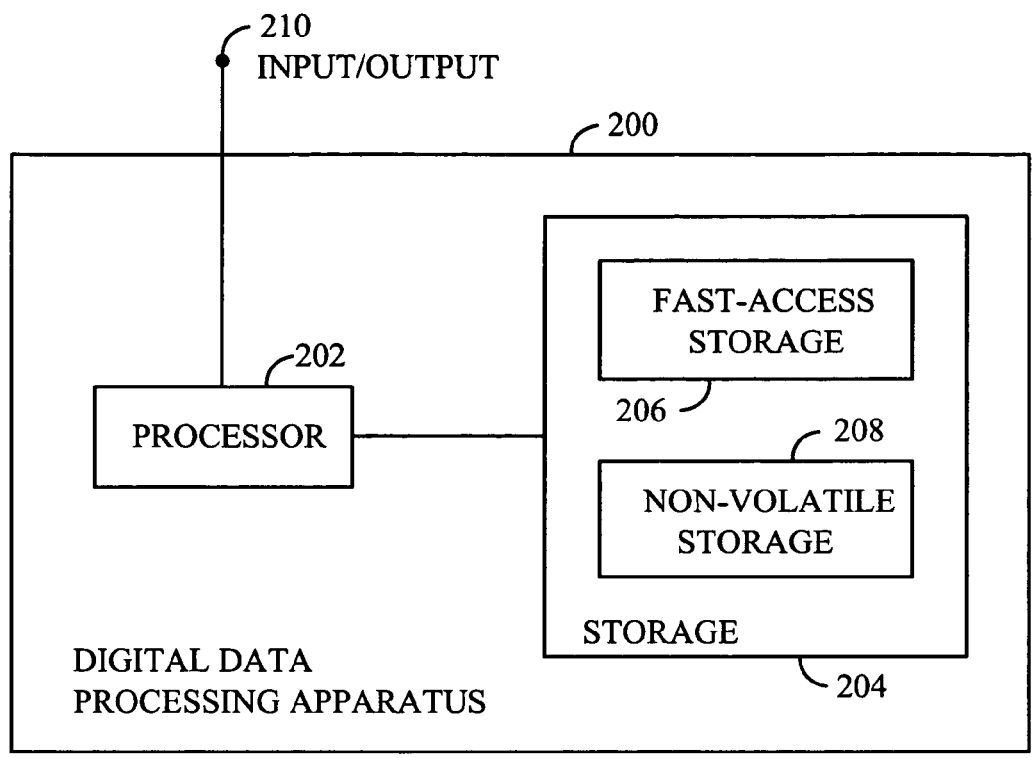
FIG. 2 is a block diagram of an exemplary digital data processing machine.
Figure 3:
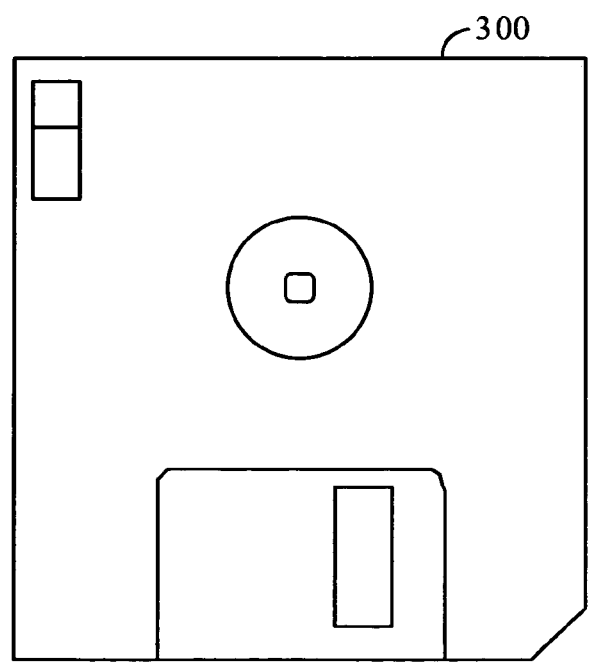
FIG. 3 is a plan view of an exemplary signal-bearing medium.

Wherever any functionality of the present disclosure is implemented using one or more machine-executed program sequences, such sequences may be embodied in various forms of signal-bearing media. In the context of FIG. 2, such a signal-bearing media may comprise, for example, the storage 204 or another signal-bearing media, such as a magnetic data storage diskette 300 (FIG. 3), directly or indirectly accessible by a processor 202. Whether contained in the storage 206, diskette 300, or elsewhere, the instructions may be stored on a variety of machine-readable data storage media. Some examples include direct access storage (e.g., a conventional "hard drive", redundant array of inexpensive disks ("RAID"), or another direct access storage device ("DASD")), serial-access storage such as magnetic or optical tape, electronic non-volatile memory (e.g., ROM, EPROM, flash PROM, or EEPROM), battery backup RAM, optical storage (e.g., CD-ROM, WORM, DVD, digital optical tape), paper "punch" cards, or other suitable signal-bearing media including analog or digital transmission media and analog and communication links and wireless communications. In an illustrative embodiment of the invention, the machine-readable instructions may comprise software object code, compiled from a language such as assembly language, C, etc.

Logic Circuitry

In contrast to the signal-bearing medium discussed above, some or all of the present disclosure's functionality may be implemented using logic circuitry, instead of using a processor to execute instructions. Such logic circuitry is therefore configured to perform operations to carry out the method aspect of the invention. The logic circuitry may be implemented using many different types of circuitry, as discussed above.

Mobile Stations—Call Model

Figure 5A:
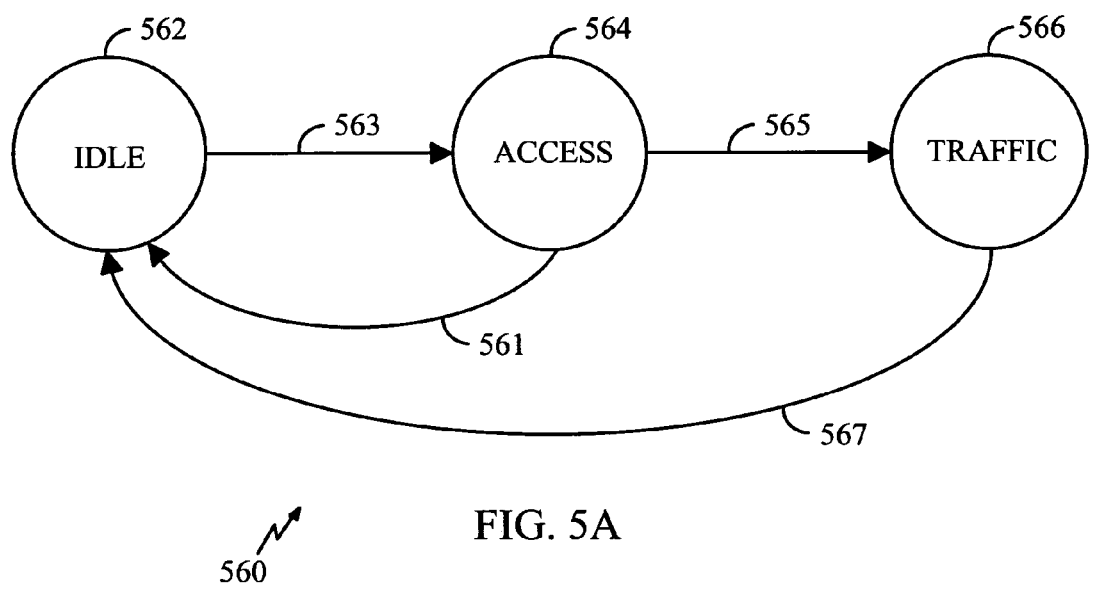
FIG. 5A is a state diagram illustrating the operational states of a mobile station.

Each mobile station 114 operates according to the state diagram 560 of FIG. 5A. In the IDLE state 562, the mobile station monitors a shared paging channel and a shared overhead channel, described in greater detail below. These channels are shared in the sense that every base station broadcasts these channels to all mobile stations in range. Briefly, the shared paging channel advises mobile stations of incoming calls and the shared overhead channel supplies various system related information. In the IDLE state 562, the mobile station may additionally receive multicast broadcast content from the base station via one or more shared broadcast channels. In the IDLE state 562, the mobile station's transmitter is turned off.

In one case, transition 563 from IDLE 562 to ACCESS 564 may occur when the mobile station sends a REGISTRATION message, advising nearby base stations of the mobile station's presence, identity, features, etc. In this case, the ACCESS state 564 transitions 561 back to IDLE 562 after the REGISTRATION message.

In another situation, transition 563 from IDLE 562 to ACCESS 564 occurs during the establishment of a point-to-point call, either by the mobile station or another party. As one example, if another party initiates the call, the mobile station receives a paging message over the common paging channel. After the mobile station answers the page on a common "access" channel, the mobile station receives assignment of a traffic channel on which to conduct the point-to-point call. The mobile station initiates an outgoing call by sending an appropriate message on the access channel, and then receiving channel assignment in the same manner.

Transition 565 from ACCESS 564 to TRAFFIC 566 occurs when an incoming or outgoing call goes through, and the mobile station and base station begin to communicate on the traffic channel. In the TRAFFIC state 566, the mobile station utilizes an individual traffic channel to conduct point-to-point communications with another party. The newly initiated point-to-point call may conduct voice, data, or even broadcast information as discussed below. If the point-to-point call carries broadcast content, then it substitutes for any shared broadcast that the mobile station was previously receiving in the IDLE state 562.

Transition 567 from the TRAFFIC 566 back to IDLE 562 occurs when the point-to-point call is terminated by either party or when the connection is otherwise broken. Transition 567 includes release of the traffic channel used to conduct the point-to-point call. If this point-to-point call contained broadcast content, then the transition 567 may optionally result in resumption of broadcast content delivery via shared channel in the IDLE state 562.

Channels

Figure 5B:
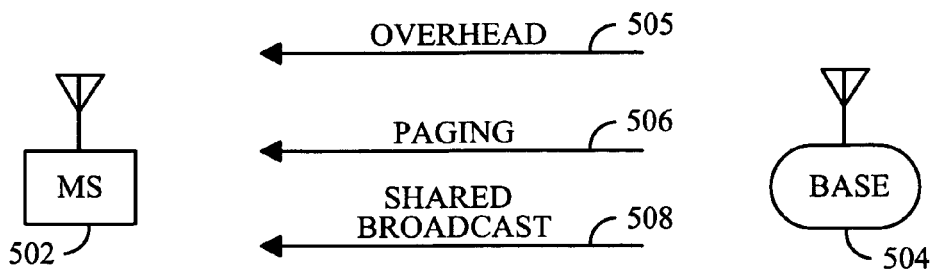
FIGS. 5B-5D are block diagrams illustrating different messages exchanged between mobile station and base stations during IDLE, ACCESS, and TRAFFIC states, respectively.
Figure 5C:
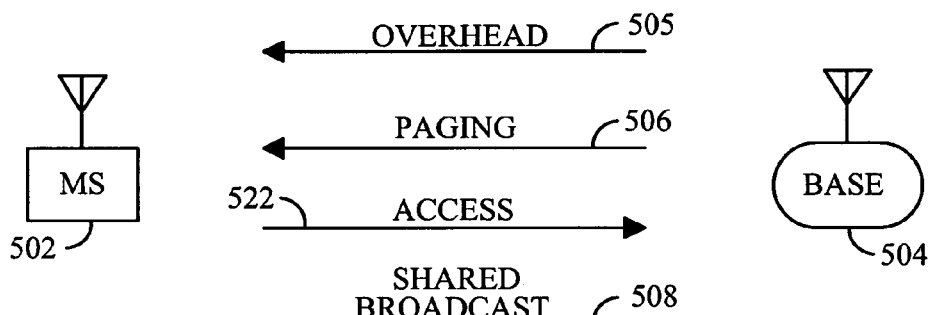
Figure 5D:
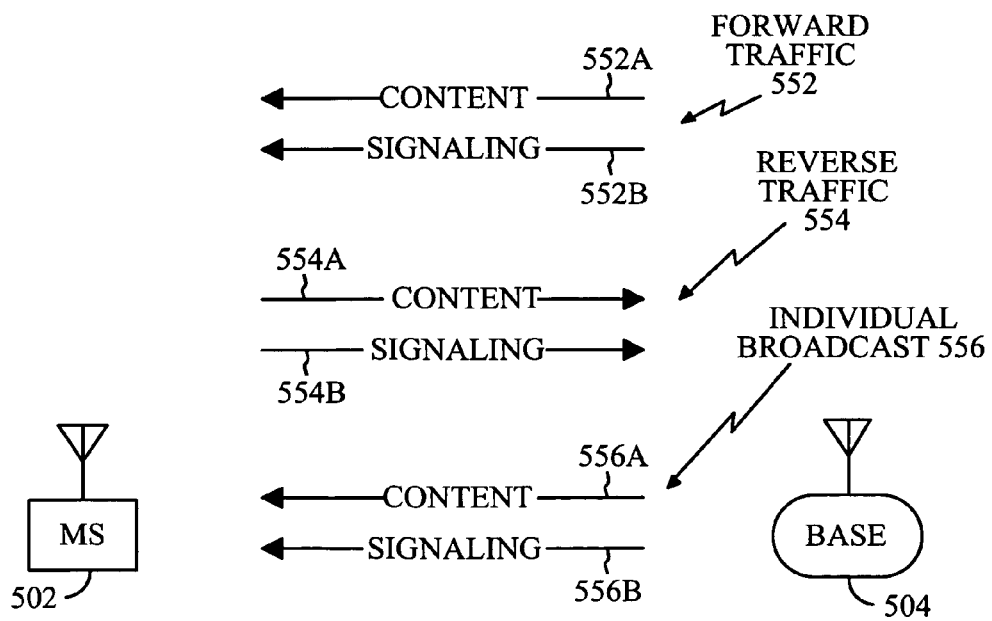

FIGS. 5B-5D describe some of the primary communications channels used to relay information between mobile station and base station during the IDLE, ACCESS, and TRAFFIC states discussed above. The broadcast channels of the present disclosure may be utilized to relay data, audio, video, or any other desired content.

"Communication channel/link" refers to a physical channel or a logical channel in accordance with the context. "Physical channel" means a communication route over which a signal propagates described in terms of modulation characteristics and coding. "Logical channel" means a communication route within the protocol layers of either the base station or the mobile station. "Reverse channel/link" means a communication channel/link through which the mobile station sends signals to the base station. "Forward channel/link" means a communication channel/link through which a base station sends signals to a mobile station.

IDLE State

FIG. 5B addresses the IDLE state 562. The base station 504 transmits the overhead channel 505 for receipt by the mobile station 502 as well as all other mobile stations being served by that base station. The overhead channel 505 contains periodically repeated system information, such as information about neighboring base stations, access information (e.g., recommended power levels, maximum message size, etc.), and system parameters (such as product revision levels, supported features, etc). In a CDMA-2000 system, the overhead channel 505 may comprise the forward broadcast control channel (F_BCCH).

As one example, contents of the overhead channel 505 may include a broadcast system parameters message (BSPM), which specifies each different broadcast program that is available over shared and/or individual channels. A "program" is a particular stream of broadcast content, such as CNN news, or ESPN, or weather information, etc. The BSPM indicates which program is on each of the base station's shared channels (and the frequency or other channel identity), and which programs can be obtained on individual channels (with specific frequencies to be determined at the time of establishing service on the individual channel). The BSPM also lists certain other information, as described in greater detail below in conjunction with FIG. 6.

The base station 504 also transmits a shared paging channel 506 for receipt by all mobile stations being served by that base station. All mobile stations served by the base station 504 monitor the paging channel 506 so that they can be alerted upon arrival of a point-to-point call or other information for them. In CDMA-2000, the paging channel 506 is exemplified by the forward control channel (F_CCCH).

The shared broadcast channel 508 encompasses potentially many shared broadcast sub-channels (parallel channels) transmitted by the base station 504 for use by mobile stations in-range of the base station. Broadly, the communication system 100 enables high-speed broadcast service by utilizing a "forward broadcast supplemental channel" (F_BSCH) capable of high data rates and suitable for receipt by a large number of mobile stations. The forward broadcast supplemental channel comprises, for example, a single forward link physical channel that carries broadcast traffic. One or more high-speed broadcast service channels are time-division-multiplexed within the single forward broadcast shared channel. Thus, the channel 508 may carry a number of different broadcast programs concurrently.

The shared broadcast channels 508 may be freely available to all mobile stations, or limited to mobile stations that have completed certain enrollment steps. Since the channel 508 is universally broadcast to all mobile stations within range, the mobile stations ultimately manage whether the user can access the broadcast or not based on whether the user has enrolled. As one example, each shared broadcast channel may be encrypted with a prescribed code, which is only provided to enrolled mobile stations.

A mechanism for enrollment to broadcast services is discussed in the following reference, the entirety of which is incorporated herein: U.S. Pat. No. 6,909,702, issued Jun. 21, 2005 and entitled "METHOD AND APPARATUS FOR OUT OF BAND TRANSMISSION OF BROADCAST SERVICE OPTION IN A WIRELESS COMMUNICATION SYSTEM." In the foregoing application, the shared broadcast channel 508 is referred to as the forward broadcast supplemental channel (F_BSCH).

ACCESS State

FIG. 5C addresses the ACCESS state 564. The mobile station 502 continues to receive the overhead 505, paging 506, and shared broadcast 508 channels. The shared access channel 522 is used by all mobile stations served by the base station 504. To begin a point-to-point call, the access channel 522 can be used in two ways. For incoming calls, the mobile station 502 uses the access channel 522 to answer a page when another station is initiating a point-to-point call to the mobile station 502. For outgoing calls, the mobile station 502 uses the access channel 522 to request initiation of a point-to-point call. In the CDMA-2000 protocol, the access channel 522 is exemplified by the reverse access channel (R_ACH). During the ACCESS state 564, the mobile station 502 may continue to monitor the shared broadcast 508.

Apart from point-to-point call initiation, the mobile station 502 may use the access channel 522 to occasionally transmit a REGISTRATION message. This serves to advise the wireless network of the mobile station 502's location, along with any other relevant information. In the event of REGISTRATION or other similar messages occurring in the ACCESS state 564, the mobile station 502 returns to IDLE 562 without entering the TRAFFIC state 566.

TRAFFIC State

FIG. 5D addresses the TRAFFIC state 566. In this state, the traffic channels 552, 554 cooperatively conduct two-way point-to-point call data between the mobile station 502 and base station 504. The channels 552, 554 are dedicated channels for individual use of the mobile station 502. The forward traffic channel 552, a "logical" channel, includes parallel physical channels such as the traffic-content channel 552a and the traffic-signaling channel 552b. The traffic-content channel 552a carries content, such as the voice information or data conveyed from the base 504 to the mobile station 502. The traffic-signaling channel 552b carries signaling information such as housekeeping, metadata, system information, and other information that describes the channel 552a and/or its content. In an alternative embodiment, the channels 552a, 552b may be unrelated, rather than being parallel channels as described. The reverse traffic channel 554 also includes parallel traffic-content and signaling channels 554a, 554b, conducting communications in the opposite direction of the channel 552.

In the TRAFFIC state, the mobile station does not use the access 522, overhead 505, or paging channels 506, since this information is conveyed on the dedicated signaling channels 552b, 554b instead.

During TRAFFIC 566, the mobile station 502 may continue to receive broadcast content. However, delivery of broadcast content concurrently with a point-to-point call 552/554 is necessarily conducted on an individual, point-to-point channel 556 rather than the shared channel 508. This is chiefly because the signaling and control procedures that are required for proper operation of mobile station are vastly different in IDLE versus TRAFFIC channels, and hence the mobile station can only be in one of these two states at any given time. Therefore, while traffic channels 552, 554 are in use, the exchange of any broadcast information during this time necessarily occurs on a traffic channel 556, with content occurring on 556*a* and signaling on 556*b*.

Generally, any forward link channel suitable for point-to-point calls may be used for the individual broadcast channel 556. Several more specific options are presented as follows. One option, using CDMA-2000 as an example, is the forward fundamental channel (F_FCH) or forward dedicated control channel (F_DCCH), which provide 14.4 Kb/s. Another option is the forward supplemental channel (F_SCH), which provides up to 1 Mb/s. A still faster option is the forward packet data channel (F_PDCH), which provides still faster service up to 2.4 Mb/s.

Unlike the IDLE 562 and ACCESS 564 states, where the mobile station 502 only communicates with a single base station, the mobile station 502 in TRAFFIC may concurrently exchange traffic and broadcast content and signaling information with multiple base stations in order to effect a soft handoff, to obtain signal redundancy, or to achieve other goals. Therefore, ordinarily skilled artisans (having the benefit of this disclosure) will recognize that the present disclosure's references to "base station" (in the singular) are made for brevity and ease of discussion. Mobile stations in TRAFFIC may communicate with multiple base stations concurrently.

In addition, techniques are known for the mobile station 502 to conduct multiple two-way telephone conversations simultaneously on traffic channels 552, 554. These techniques involve, for example, time multiplexing different data streams so that a given channel can carry more than one. Utilizing similar technology, the present disclosure contemplates the mobile station 502 receiving multiple, concurrent broadcast programs on the individual channel 556.

Further Information

The physical and logical channels used in high speed broadcast services are discussed in greater detail in the following references, the entireties of which are incorporated herein by reference: (1) CDMA 2000 Physical Layer Standard, known as IS__2000.2, (2) U.S. Pat. No. 6,980,820, issued Dec. 27, 2005 and entitled "METHOD AND APPARATUS FOR SIGNALING IN BROADCAST COMMUNICATION SYSTEM." The use of common and dedicated channels for information broadcast is disclosed in the following reference, the entirety of which is incorporated herein by reference: U.S. Patent Application No. 60/279,970, filed Mar. 28, 2001 and entitled "METHOD AND APPARATUS FOR GROUP CALLS USING DEDICATED AND COMMON CHANNELS IN WIRELESS NETWORKS."

BSPM

As mentioned above, each broadcast-capable base station repeatedly broadcasts a representative BSPM over the overhead channel 505 to advise mobile stations of that base station's available broadcast content and related information. FIG. 6 shows the contents of an exemplary BSPM 600 for a subject base station. Although expressed in tabular form for ease of understanding, the BSPM in practice comprises a stream of signals including headers, trailers, packet information, or other metadata and formatting suitable for wireless broadcast.

As shown in FIG. 6, the BSPM 600 includes various columns, each representing a different category of information. The column 600 lists the channel content, namely, that channel's "broadcast program." The column 606 indicates whether the base station is programmed, configured, or otherwise equipped with the ability to provide the subject program on individual channels, that is, whether the subject program is "available" via individual channel.

The column 608 indicates whether the subject base station is equipped to provide the subject program on a shared channel, that is, whether the subject program is "available" via shared channel from the base station. The column 604 lists various characteristics of the shared channel used to broadcast the subject program, such as Walsh code, modulation type, Viterbi coding, data rate, error correction, and the like. The column 609 lists the identity of the shared channel (if applicable) used to broadcast the subject program, namely, the logical frequency and/or physical bandwidth used by the subject base station. The column 610 indicates whether the base station is presently transmitting the subject program on the shared channel 609.

The BSPM may be expanded to include a variety of other information, and likewise abbreviated to leave out certain information listed above. For example, the base station may provide the channel identities 609 upon demand, to shorten the BSPM 600 and save bandwidth on the overhead channel 505. Likewise, the "now transmitting" column 610 may be omitted, since a mobile station may use trial and error to determine whether the base station is transmitting a particular program via shared channel.

Furthermore, as mentioned below, the BSPM may be omitted entirely. As another option, sole contents of the BSPM may be a flag (not shown) indicating the fact that broadcast services are generally available, and with further information being available from the base station upon mobile station query.

Overall Operation

Figure 7:
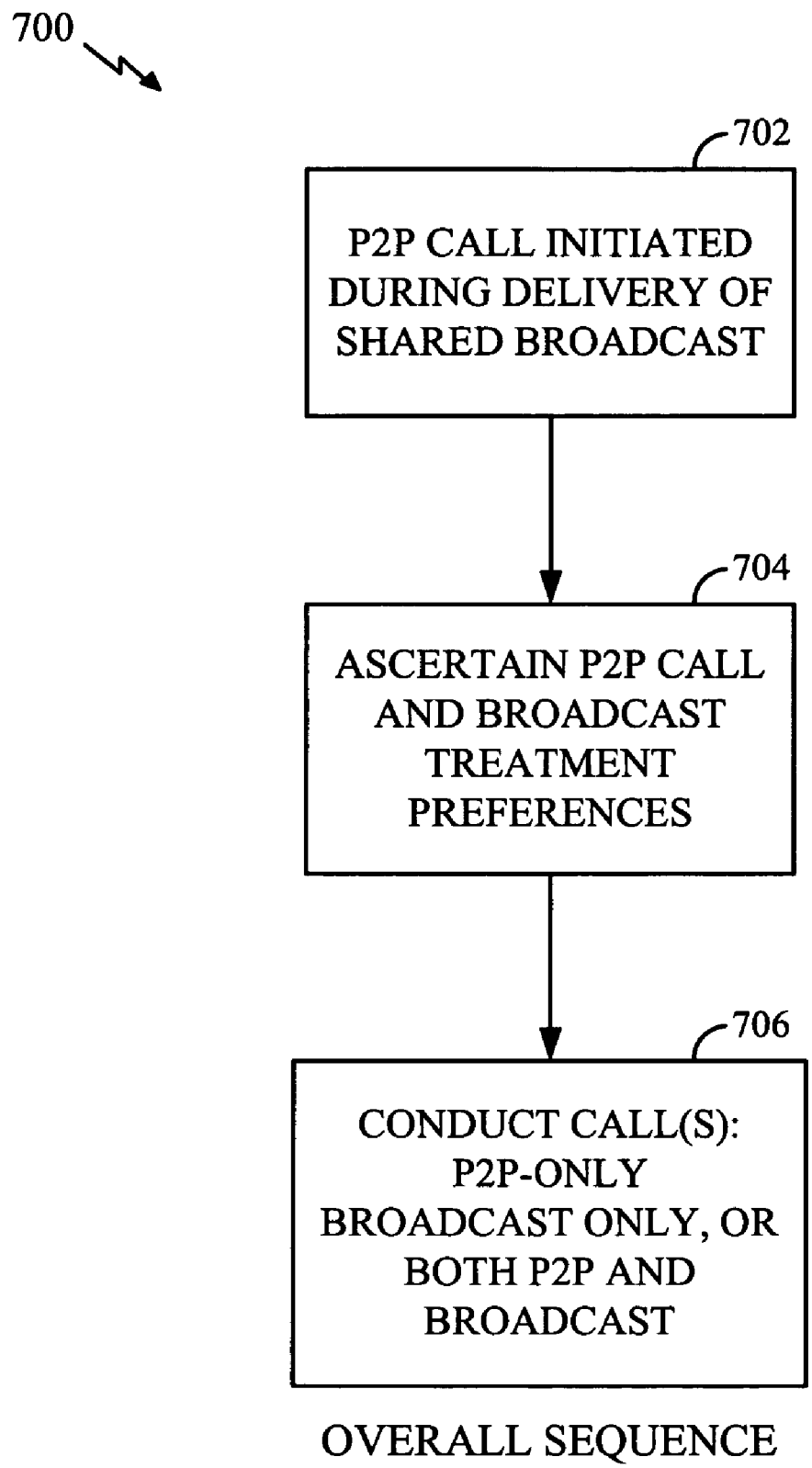
FIG. 7 is a flowchart illustrating overall operations to manage the point-to-point call and broadcast connection under circumstances where a mobile station that is receiving broadcast content additionally receives or places a point-to-point call.

FIG. 7 shows a sequence 700 describing the overall operation of a wireless communications system in regard to processing point-to-point calls initiated by (or placed to) a mobile station while that mobile station is already receiving broadcast programming via shared broadcast channel. For ease of description, without any intended limitation, the sequence 700 is described in conjunction the components of FIGS. 1-6 as discussed above.

For ease of reference, FIG. 7 (as well as FIGS. 8-10) illustrate various operations performed by a "mobile station", which may also be referred to as a mobile, subscriber station, wireless telephone, or other names depending upon the context. Furthermore, these Figures also illustrate other operations performed by a "network," which may refer to the wireless communication systems' network facilities, one or more base stations, or another one or more components of the communication system's software and/or hardware infrastructure.

In step 702, a point-to-point is initiated between a wireless mobile station and a remote party. This occurs while the wireless mobile station is already receiving broadcast content via a multi-user forward-link broadcast channel. The point-to-point call may be initiated by the mobile station ("incoming") or initiated by a remote party placing a call to the mobile station ("outgoing").

Step 704 ascertains preferences as to prescribed categories of operating conditions including at least the following: (1) whether to continue receiving the broadcast content, (2) election between the point-to-point call and the broadcast content should network resources be unable to conduct the point-to-point call and broadcast content concurrently. In case of an incoming call, the categories also include whether to receive an incoming point-to-point call. Optionally, another prescribed category of operating condition may include election among multiple programs of broadcast content should network resources be unable to conduct all programs concurrently. For example, there may be a preference for CNN broadcast over ESPN, etc.

In the illustrated embodiment, step 704 is performed by the mobile station querying a human operator, consulting pre-stored preferences, utilizing default options, or a combination of these or other acts; in this embodiment, the mobile station also notifies the wireless network of the preferences. In an alternative embodiment, some or all of the mobile's preferences may be pre-stored at the network, avoiding the need for the mobile to notify the network of preferences. Pre-storing may be designated for all circumstances, for a given time period, for certain calls or telephone numbers, or any other basis.

Step 706 acts, in accordance with the preferences, to conduct communications in one of the following modes: (1) conducting the point-to-point call and discontinuing reception of the broadcast, (2) conducting the point-to-point call and continuing broadcast reception. In the case of an incoming call, the modes also include aborting completion of the incoming point-to-point call and continuing reception of the broadcast. In the illustrated embodiment, step 706 is performed by a primary base station in communication with the mobile station, and step 706 involves one of the following operations: (1) if the mobile's preferences were to discontinue the broadcast, completing the point-to-point call without regard for continuing the broadcast, (2) if the mobile's preference involved an election of the point-to-point call over the broadcast, completing the point-to-point call should network resources be able to conduct the point-to-point call and broadcast content concurrently, (3) if the mobile's preference involved an election of the broadcast over the point-to-point call, aborting completion of the point-to-point call should network resources be unable to conduct the point-to-point call and broadcast content concurrently. In the case of an incoming call, where the mobile indicates a preference not to take the call, an additional possibility is that the base station aborts completion of the call and permits the mobile to continue receiving the broadcast.

Exemplary Message Codes

In various CDMA communications systems, such as CDMA-2000, the mobile stations and network communicate using various messages of standard meaning, such as an ORIGINATION message, REGISTRATION message, PAGE RESPONSE message, and many more. To illustrate one specific embodiment of the disclosed system in greater detail, without any intended limitation, various message codes are utilized to supplement the standard messages. Message codes may be included with interrelated packet data, incorporated into a header or other metadata, or otherwise packaged with a carrier message. In an alternative embodiment, the message codes are sent as standalone messages themselves. Some message codes are used with messages sent from mobile station to network, others used with messages sent from network to mobile. As long as the message code's value, such as "0" or "1" is included, the name of the message code itself may be omitted if the type of message code is apparent from the relative position or other information inherent to the message code value. For example, the message code and value "BCMCS_REQ=1" may be abbreviated by the value "1" if it is distinctly located. Some exemplary message codes and their values are discussed as follows.

BCMCS_REQ

This message code is transmitted by a mobile station in conjunction with a message accepting an incoming call (such as a PAGE RESPONSE message) or in conjunction with a message placing an outgoing call (such as an ORIGINATION message). A value of "1" means that the mobile station requests a concurrent shared broadcast along with the point-to-point call being initiated. A value of "0" means that the mobile station does not request concurrent shared broadcast.

BCMCS_REQ_PRIORITY

As with BCMCS_REQ, this message code is transmitted by a mobile station in conjunction with a message placing or accepting a point-to-point call. The value of this message code selects between the broadcast and point-to-point call should network resources be unable to provide the mobile station with both. A value of "1" means that the mobile station prefers the point-to-point call, and a value of "0" means that the mobile station prefers the broadcast.

BCMCS_ID_PRIORITY

This message code is transmitted by a mobile station in conjunction with a message accepting an incoming call or placing an outgoing call. In association with a given broadcast program, the BCMCS_ID_PRIORITY message code designates a priority for that broadcast relative to other, specified broadcast programs, should. network resources be unable to supply all programs concurrently. The associated broadcast program may be identified by another message, parameter, or code, with one example being a broadcast service identifier (BCMCS_ID) message code. As for the BCMCS_ID_PRIORITY, a value of "1" means that the given program has high priority relative to other programs, and a value of "0" means that the program has lower priority. Alternatively, the BCMCS_ID_PRIORITY code may utilize a wider selection of values (such as 1-10), so that the mobile can more precisely rank the broadcast programs relative to each other.

BCMCS_INFO_INCL

This message code is transmitted by the network to a mobile station in conjunction with a message completing a call to/from the mobile station. For instance, the BCMCS_INFO_INCL message code may be provided in conjunction with a CHANNEL ASSIGNMENT message, which assigns a channel for the mobile station to utilize in conducting a point-to-point call. A value of "1" shows that the CHANNEL ASSIGNMENT message also includes information granting an individual broadcast channel to the mobile station, and a value of "0" shows that broadcast channel information is not included.

USE_SAME_BCMCS_INF

This message code is transmitted by the network in conjunction with a message completing a call to/from the mobile station, for example a CHANNEL ASSIGNMENT message. If value of "1" indicates that the mobile should continue using the same broadcast channel information, and a value of "0" indicates that the new broadcast channel information is included for the mobile's attention. The broadcast channel information may include frequency, data rate, Walsh code, and/or other characteristics.

NUM_BCMCS_SESSION, NUM_FBSCH

These message codes are transmitted by the network to identify the broadcast channels and other configuration information when a point-to-point call is granted and the broadcast configuration changes. The NUM_BCMCS_SESSION message code indicates the number of broadcast programs being assigned to this mobile station, whereas the NUM_FBSCH indicates the number of broadcast supplemental channel to be used in delivering the broadcast.

These and other message codes are described in greater detail below in association with the related Figures.

Mobile Station—Outgoing Call

Figure 8:
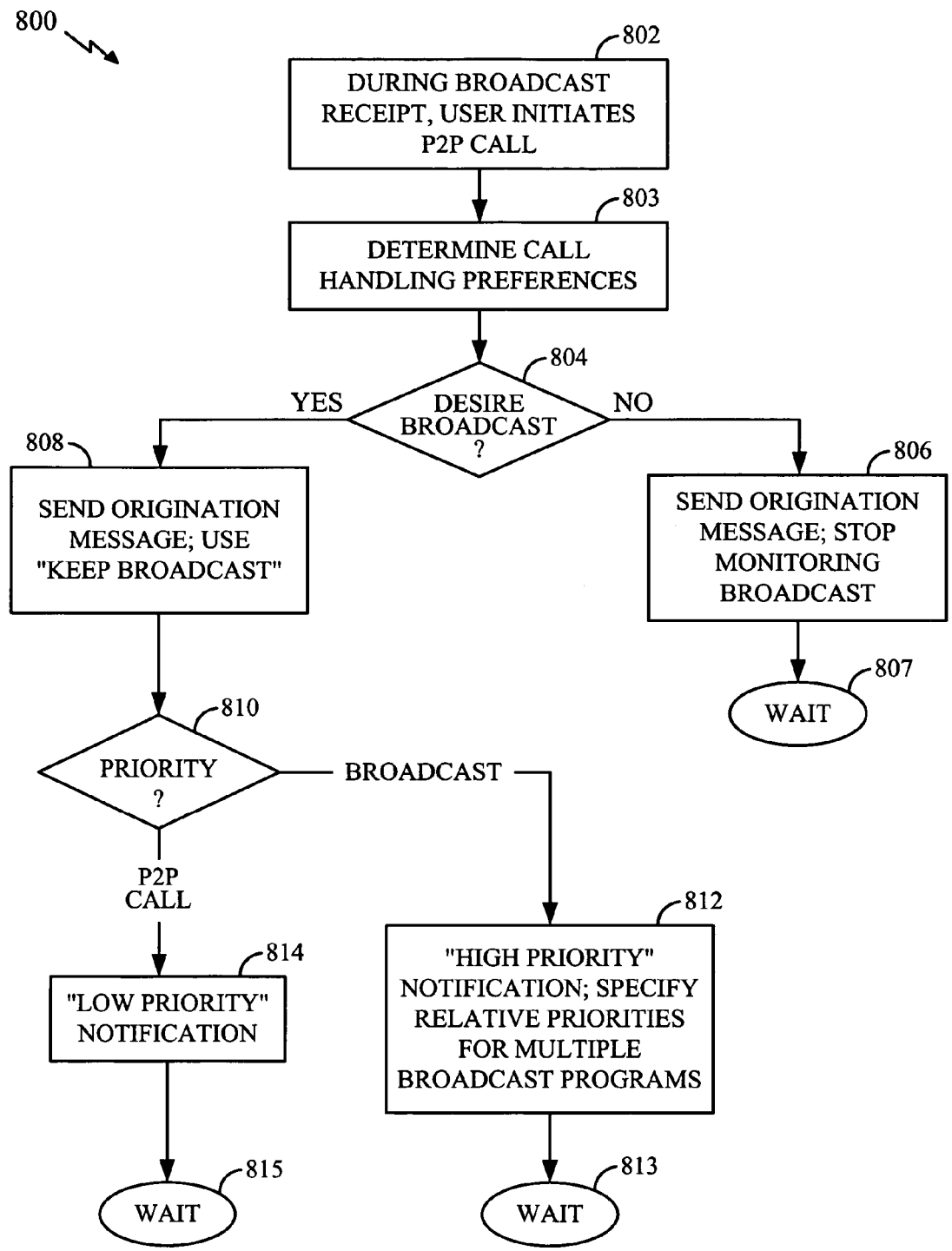
FIG. 8 is a flowchart illustrating the operation of a mobile station to process an outgoing point-to-point call when the mobile station is already receiving broadcast content.

FIG. 8 depicts operations 800 performed by a mobile station to begin an outgoing point-to-point call when the mobile is already receiving a shared broadcast. For ease of description, without any intended limitation, the sequence 800 is described in conjunction the components of FIGS. 1-6 as discussed above.

In step 802, the mobile station receives operator initiation of a point-to-point call to a remote station. This occurs while the mobile station is already receiving broadcast programming via a multi-user forward-link broadcast channel. At step 802 the mobile station is in the IDLE state 562. Operator initiation may occur, for example, by the operator entering a telephone number or representative shorthand code utilizing a keypad, digitizing pad, voice recognition engine, or any other means.

Responsive to the operator initiation, the mobile station next determines various call-handling preferences (step 803), and then performs various acts (steps 804-815) accordingly. In the illustrated example, the call-handling preferences include a decision as to whether the mobile station desires to continue receiving the shared broadcast, and also an election of priority as between the point-to-point call and the broadcast should a conflict in network resources arise. Step 803 may be performed by the mobile station querying a human operator, consulting a record of preferences pre-stored at the mobile station or other site, utilizing a default value, or a combination of these or other techniques.

If the call handling preferences of step 803 indicate no desire to continue the broadcast, the mobile station sends an ORIGINATION MESSAGE to begin the call (step 806). This takes the mobile from IDLE 562 to ACCESS 564. The mobile station also sends additional messaging expressing disinterest in continued receipt of the broadcast content. The additional messaging may be separate from the ORIGINATION MESSAGE, or an ancillary part such as a parameter, predefined flag, annex, or other metadata component. For example, the additional messaging may comprise a message code BCMCS_REQ with value "0." After step 806, the mobile waits (807) for network signaling to complete the call, for example, by sending a CHANNEL ASSIGNMENT message.

In contrast to steps 806-807, step 808 is performed if step 804 indicates desired to continue the broadcast. In step 808, the mobile station sends an ORIGINATION MESSAGE to begin the call, thus taking the mobile from IDLE 562 to ACCESS 564. The mobile station also sends additional messaging expressing interest in continued receipt of the broadcast content. The additional messaging may be separate from the ORIGINATION MESSAGE, or an ancillary part such as a parameter, predefined flag, annex, or other metadata component. For example, the additional messaging may comprise a message code BCMCS_REQ with value "1."

After step 808, step 810 advances to steps 812 or 814 depending upon whether the call handling preferences (from step 803) prefer the broadcast over the point-to-point call (812) or vice versa (813). If the broadcast is preferred, the mobile sends (812) additional messaging stating that the broadcast has priority, should any conflict arise. The additional messaging may be separate from the ORIGINATION MESSAGE (of step 808), or an ancillary part such as a parameter, predefined flag, annex, or other metadata component. For example, the additional messaging may comprise a message code BCMCS_REQ_PRIORITY with value "0." Also in step 812, if the mobile is receiving multiple broadcast programs, the mobile may specify relative priorities among the multiple broadcasts. For example, this may be achieved with use of the BCMCS_ID_PRIORITY message code. After step 812, the mobile waits (813) for network signaling to complete the call, for example, by sending a CHANNEL ASSIGNMENT message. Ultimately, when the call is completed, the mobile enters the TRAFFIC state 566.

In contrast, if the point-to-point call is preferred over the broadcast (should any conflict arise), step 810 advances to step 814. In step 814, the mobile sends additional messaging stating that the call has priority over the broadcast should any conflict arise. The additional messaging may be separate from the ORIGINATION MESSAGE (of step 808), or an ancillary part such as a parameter, predefined flag, annex, or other metadata component. For example, the additional messaging may comprise a message code BCMCS_REQ_PRIORITY with value "1." After step 814, the mobile waits (815) for network signaling to complete the call, for example, by sending a channel assignment message. Ultimately, when the call is completed, the mobile enters the TRAFFIC state 566.

Mobile Station—Incoming Call

Figure 9:
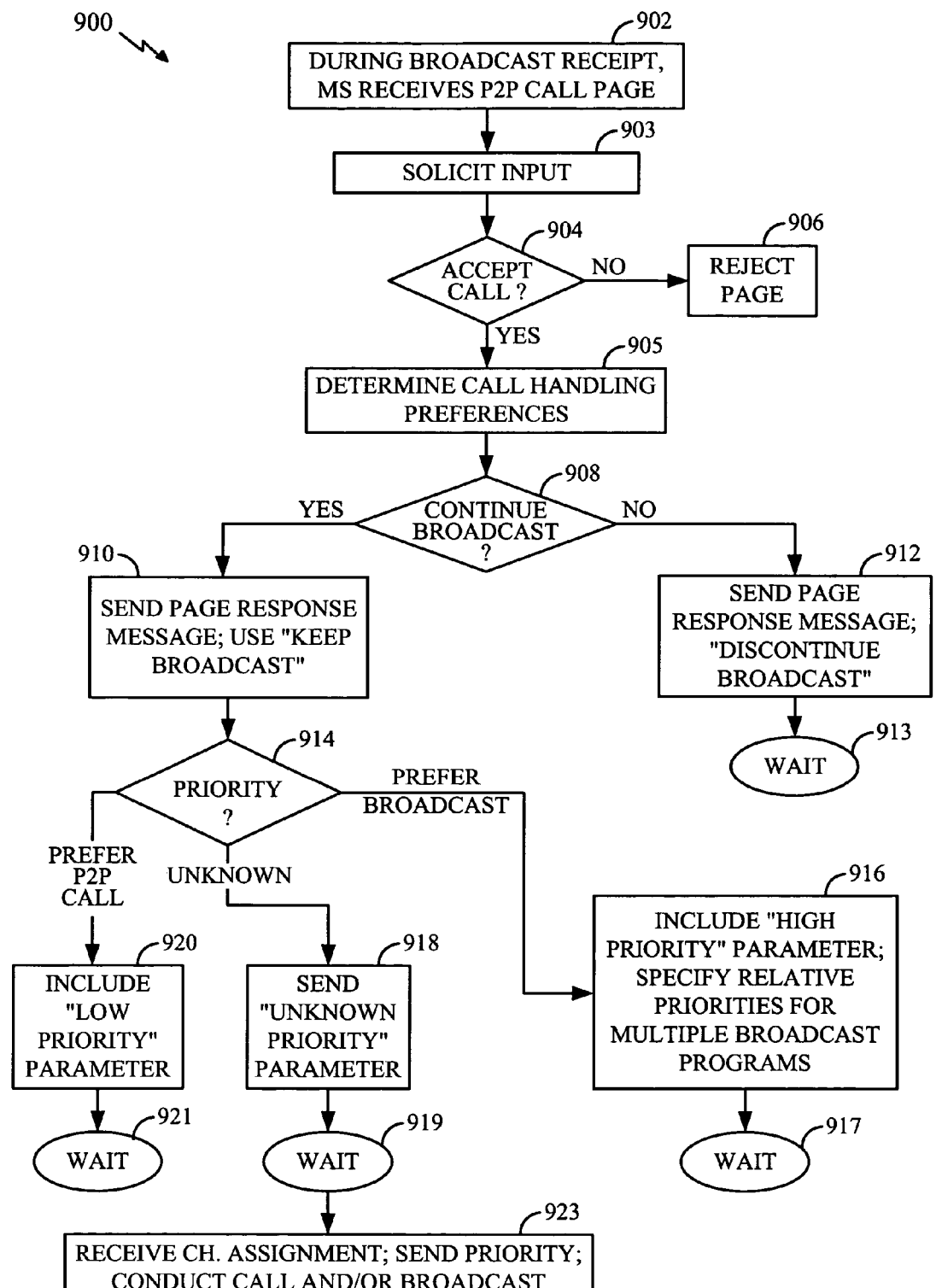
FIG. 9 is a flowchart illustrating the operation of a mobile station to process an incoming point-to-point call when the mobile station is already receiving broadcast content.

FIG. 9 depicts operations 900 performed by a mobile station to process an incoming point-to-point call when the mobile is already receiving shared broadcast programming. For ease of description, without any intended limitation, the sequence 900 is described in conjunction the components of FIGS. 1-6 as discussed above.

In step 902, the mobile station receives network notification of a point-to-point call arising from a remote station. This occurs while the mobile station is already receiving broadcast content via a multi-user forward-link broadcast channel, in the IDLE state 562. Network notification may occur, for example, by receipt of a paging message from a base station in communication with the mobile station. When the call notification arrives, the mobile station enters the ACCESS state 564.

Responsive to step 902, the mobile station solicits operator input to determine whether to accept or deny the incoming call (step 903). Step 903 may be performed by the mobile station ringing the phone, vibrating the phone, displaying a message, or a combination of these or other techniques, and thereafter receiving the operator input by voice, stylus, keypad entry, etc. Alternatively, step 904 may be resolved without operator input, for example, if the mobile has been programmed with standing instructions as to handling of incoming calls.

After step 903, step 904 advances to steps 906 or 905 depending upon whether the operator prefers to reject the incoming call (906) or accept the call (905). If the call is rejected, step 904 advances to step 906, where the mobile rejects the network's page, for example, by sending a negative PAGE RESPONSE message or by neglecting to answer the page. In this case, the mobile leaves the ACCESS state 564 for the IDLE state 562.

If the call is accepted, step 904 advances to step 905, where the mobile determines various call-handling preferences. In the illustrated example, the call-handling preferences concern decisions as to prescribed categories of operating conditions including at least the following: (1) whether to continue receiving the broadcast content, (2) election between the point-to-point call and the broadcast content should network resources be unable to conduct the point-to-point call and broadcast content concurrently. The gathering of call-handling preferences in step 905 may be performed by the mobile station querying a human operator, consulting a record of preferences pre-stored at the mobile station or other site, utilizing a default value, or a combination of these or other techniques.

Having determined the call-handling preferences, the mobile sends the network further messaging stating these preferences, as discussed in greater detail below. More particularly, step 908 advances to steps 910 or 912 depending upon whether the call handling preferences (from step 905) prefer to maintain the broadcast connection (910) or abandon the broadcast (912).

If the mobile is to discontinue the broadcast connection, the mobile sends a PAGE RESPONSE message accepting the call (step 912); the mobile station also transmits additional messaging expressing disinterest in continued receipt of the broadcast content. The additional messaging may be separate from the PAGE RESPONSE message, or an ancillary part such as a parameter, predefined flag, annex, or other metadata component. For example, the additional messaging may comprise a message code BCMCS_REQ with value "0." After step 912, the mobile waits (913) for network signaling to complete the call, for example, by sending a CHANNEL ASSIGNMENT message, whereupon the mobile will enter the TRAFFIC state 566.

In contrast, if step 908 finds that the broadcast connection is to be maintained, the mobile sends a PAGE RESPONSE message accepting the call (step 910); the mobile station also transmits additional messaging expressing interest in continued receipt of the broadcast content. The additional messaging may be separate from the PAGE RESPONSE message, or an ancillary part such as a parameter, predefined flag, annex, or other metadata component. For example, the additional messaging may comprise a message code BCMCS_REQ with value "1."

After step 910, step 914 advances to steps 916, 918, or 920 depending upon whether the call handling preferences (from step 905) prefer the broadcast over the point-to-point call (916), prefer the point-to-point call over the broadcast (920), or such preference is unknown (step 918). If the broadcast is preferred, the mobile sends (916) additional messaging stating that the broadcast has priority, should there be any conflict. For example, the additional messaging may comprise a message code BCMCS_REQ_PRIORITY with value "0." if the point-to-point call is preferred, the mobile sends (920) additional messaging stating that the call has priority. For example, the additional messaging may comprise a message code BCMCS_REQ_PRIORITY with value "1." The additional messaging of steps 916, 920 may be separate from the PAGE RESPONSE message (of step 910), or an ancillary part such as a parameter, predefined flag, annex, or other metadata component. After steps 916 or 920, the mobile waits in steps 917 or 921 (respectively) for network signaling to complete the call, for example, by sending a CHANNEL ASSIGNMENT message, whereupon the mobile will enter the TRAFFIC state 566.

If the relative call/broadcast priorities are unknown, the mobile withholds any indication of priority election at this time, for example by sending (918) additional messaging representing "unknown priority." This additional messaging may be separate from the PAGE RESPONSE message (of step 910), or an ancillary part such as a parameter, predefined flag, annex, or other metadata component. Alternatively, instead of sending any messaging regarding "unknown priority," the mobile indicate this fact by omitting any priority related messaging, in which case step 918 is omitted. After step 918, or after step 914 if step 918 is omitted, the mobile waits (919) for a CHANNEL ASSIGNMENT message from the network. Responsive to receiving channel assignment (step 923), the mobile station sends a representation of the call/broadcast priorities, and thereafter conducts the point-to-point call, broadcast, or both, depending on the direction of the network according to the availability of network resources for these actions. If the point-to-point call is completed, the mobile enters the TRAFFIC state 566.

Network Operations

Figure 10:
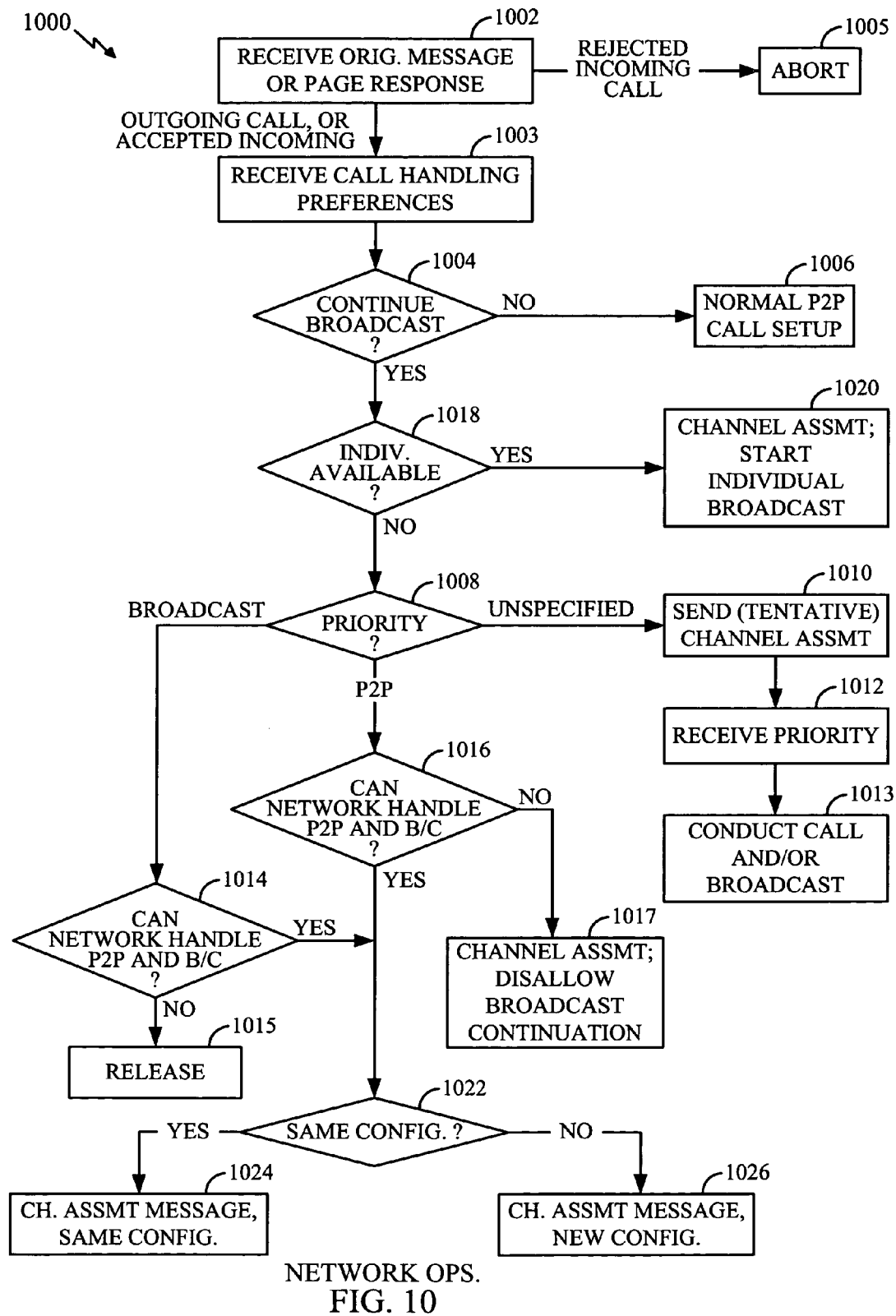
FIG. 10 is a flowchart illustrating the network operations to manage point-to-point call and broadcast content delivery.

FIG. 10 depicts operations 1000 performed by the network to process a point-to-point call to/from a mobile station, this call being initiated when the mobile is already receiving shared broadcast programming. For ease of description, without any intended limitation, the sequence 1000 is described in conjunction the components of FIGS. 1-6 as discussed above. As a more particular example, the operations 1000 may be performed by a base station with which the mobile is already communicating (the "primary base station").

In step 1002, the network receives initiation of a point-to-point call to or from the subject mobile. If the call was placed from a remote station to the mobile station, the notification of step 1002 arrives in the form of the mobile's PAGE RESPONSE message (e.g., FIG. 9, steps 910, 912). If the call is being placed from the mobile station to a remote station, the notification of step 1002 arrives in the form of an ORIGINATION message (e.g., FIG. 8, step 806, 808).

If the PAGE RESPONSE message rejects the incoming point-to-point call, the network aborts completion of the point-to-point call (step 1005). Otherwise, if the PAGE RESPONSE message indicates call acceptance, or if the subject point-to-point call is an outgoing call, step 1002 advances to step 1003.

In step 1003, the network receives notification of the mobile's call handling preferences, which include at least: (1) whether to continue receiving the broadcast content, and (2) election between the point-to-point call and the broadcast content should network resources be unable to conduct the point-to-point call and broadcast content concurrently. In the illustrated example, the network's receipt (1003) of the mobile's call handling preferences corresponds to the mobile's transmission of messaging that is supplemental to PAGE RESPONSE (e.g., steps 910, 912, 916, 918, or 920), or messaging that is supplemental to CALL ORIGINATION (e.g., steps 806, 808, 812, 814). Examples of this messaging are the message codes described above.

After step 1003, depending upon the mobile's call handling preferences, the network performs one of the following operations: (1) completing the point-to-point call without regard for continuing the broadcast, (2) completing the point-to-point call should network resources be able to conduct the point-to-point call and broadcast content concurrently, (3) aborting completion of the point-to-point call should network resources be unable to conduct the point-to-point call and broadcast content concurrently.

More specifically, in step 1004 the network proceeds to step 1006 if the mobile's call handling preferences express disinterest in the broadcast. In this event, the network engages in a normal point-to-point call setup. The network utilizes the mobile's expressed disinterest in the broadcast for housekeeping purposes to discontinue the broadcast with respect to this mobile; more specifically, this may be achieved by the network setting the BCMCS_INFO_INCL flag to "0" in the CHANNEL ASSIGNMENT message. Other mobiles, however, continue to receive the shared broadcast service.

Otherwise, if step 1004 finds that the call handling preferences do indicate an interest in the broadcast, step 1004 proceeds to step 1018. In step 1018, the network determines whether there is an individual channel available to conduct the broadcast, instead of the present shared channel. This depends upon whether the base station in communication with the mobile is deployed to provide broadcast programming over individual channels, and also whether the additional power requirement for assigning an individual channel can be justified at the base station. An individual channel is preferred because the management of broadcast over individual channels is similar to the management of the point-to-point call and hence the network procedures are simpler. If an individual channel is available, the network assigns the mobile to this channel (step 1020) and begins transmitting the broadcast content to the mobile on this channel. Delivery of broadcast content on individual channels is discussed in greater detail in various U.S. patent applications assigned to QUALCOMM CORPORATION, including one or more of the QUALCOMM patent applications specifically identified above.

In contrast, if step 1018 finds that an individual channel is not available, the routine 1000 proceeds to step 1008. In step 1008, the network directs the routine 1000 to steps 1014, 1010, or 1016 based on the mobile's election of the broadcast or point-to-point call indicated by the call handling preferences (from step 1003). Step 1014 is selected when the broadcast is elected over the point-to-point call (corresponding to steps 812, 916), step 1010 is selected when the priority is unknown (corresponding to step 918), and step 1016 is utilized when the point-to-point call has priority (corresponding to steps 814, 920).

Step 1014 determines whether the network can accommodate the point-to-point call and broadcast content delivery concurrently. This determination is based on factors such as whether the shared broadcast channel is in the same frequency as where the point-to-point call is to be assigned and whether the network is equipped to handle the complexities of concurrent broadcast and point-to-point call. If the network cannot accommodate the point-to-point call and a shared broadcast, the network releases the point-to-point call (1015). The call may be released, for example, by the base station sending a RELEASE message to the mobile station over the paging channel. On the other hand, if the network can accommodate both call/broadcast, step 1014 advances to step 1022, which is discussed in greater detail below.

Like step 1014, step 1016 determines whether the network can concurrently accommodate the point-to-point call and shared broadcast content delivery. Unlike step 1014, however, if the network cannot accommodate both call/broadcast, the network terminates the broadcast (with respect to the current mobile) and completes the point-to-point call (step 1017). The network may complete the call, for example, by issuing a CHANNEL ASSIGNMENT message, which assigns the mobile station to a particular channel for conducting the point-to-point call. The network's termination of the broadcast means that it prevents the mobile from continuing to receive the broadcast service while on the point-to-point call; more specifically, this may be achieved by the network setting the BCMCS_INFO_INCL flag to "0" in the CHANNEL ASSIGNMENT message. Other mobiles, however, continue to receive the shared broadcast service. In contrast, if step 1016 finds that the call/broadcast combination is sustainable, the routine 1000 passes to step 1022, described below.

In step 1022, before completing arrangements for shared broadcast and point-to-point call delivery, the network determines whether the broadcast can continue using the same delivery mechanism, or whether it is necessary to conduct the broadcast using a different configuration to concurrently engage in the point-to-point call. Changes in the delivery mechanism, or "configuration," may involve changes in frequency, data rate, Walsh code, multiplexing format, frame size, coding type and/or other signal characteristics. Various situations may arise, for example, where the frequency used to deliver the broadcast content cannot tolerate addition of a point-to-point call. For example, base station may allocate specified number of calls in each frequency for load balancing purposes and hence may not be able to assign a point-to-point call in a frequency where due to the high-power requirement.

After step 1022, the network provides channel assignment for the point-to-point call in steps 1024 or 1026. Step 1024 assigns a channel of the same frequency as the current broadcast content, whereas step 1026 assigns a channel of a different frequency for the point-to-point call and also instructs the mobile to start receiving broadcast content over that different frequency. As a more specific example, step 1024 may include the message code BCMCS_INFO_INCL with value "1" (since the broadcast is being continued), and the message code USE_SAME_BCMCS_IND with value "1" (since the same broadcast configuration is used). Similarly, step 1026 may use the message code BCMCS_INFO_INCL with value "1" (since the broadcast is being continued), and a message code USE_SAME_BCMCS_IND with value "0" (since a different broadcast configuration is used). Step 1026 may also utilize the NUM_BCMCS_SESSION and NUM_FBSCH message codes to identify the specifics of the new channel configuration.

In contrast to the previous two situations (1014, 1016), step 1008 advances to step 1010 if the mobile station did not specify relative priorities for the point-to-point call and broadcast. In this case, the network sends a CHANNEL ASSIGNMENT message in step 1010, tentatively assigning a channel for the mobile to conduct the point-to-point call. The channel assignment is tentative because, without the mobile station's election between call/broadcast, the network cannot determine whether this channel will actually be needed, as discussed below. In step 1012, the network receives the mobile station's election of priority, which was sent at step 923 (FIG. 9).

Next, based on the mobile's expression of priority from step 1012, the network conducts the call, broadcast, or both (step 1013). Namely, the network performs one of the following: (1) releasing the channel assigned in step 1010, if the mobile has elected the broadcast and network resources cannot handle the call/broadcast concurrently, (2) terminating the broadcast, if the mobile has elected the point-to-point call and network resources cannot support concurrent call/broadcast, or (3) conducting both point-to-point call and broadcast if network conditions permit.

Other Embodiments

Those of skill in the art understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC.

Moreover, the previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The word "exemplary" is used herein to mean "serving as an example, instance, or illustration." Any embodiment described herein as "exemplary" is not necessarily to be construed as preferred or advantageous over other embodiments.

What is claimed is:

1. A wireless mobile station for use in a wireless communications network, comprising:
   a transceiver;
   a speaker;
   a microphone;
   a user interface;
   a manager, coupled to the transceiver, speaker, microphone, and user interface, and programmed to perform operations comprising:
      receiving operator initiation of an outgoing point-to-point call to a remote station while the mobile station is receiving broadcast content via a multi-user forward-link broadcast channel;
      responsive to the operator initiation, determining a call-handling preference and according thereto performing operations including one of the following:
         sending the network a CALL ORIGINATION message and additional messaging expressing disinterest in continued receipt of the broadcast content;
         sending the network a CALL ORIGINATION message and further messaging expressing interest in continued receipt of the broadcast content, the further messaging containing election between the point-to-point call and the broadcast content should network resources be unable to conduct both concurrently;
      waiting for signaling from the network to complete the point-to-point call.

2. A wireless mobile station, comprising:
   transceiver means for wirelessly transmitting and receiving signals;
   speaker means for producing audio output from electrical input;
   microphone means for producing electrical output from audio input;
   user interface means for converting human input to machine-readable input and converting machine-readable output to human-readable output;
   manager means, coupled to the transceiver means, speaker means, microphone means, and user interface means, for performing operations comprising:
      receiving operator initiation of an outgoing point-to-point call to a remote station while the mobile station is receiving broadcast content via a multi-user forward-link broadcast channel;
      responsive to the operator initiation, determining a call-handling preference and according thereto performing operations including one of the following:
         sending the network a CALL ORIGINATION message and additional messaging expressing disinterest in continued receipt of the broadcast content;
         sending the network a CALL ORIGINATION message and further messaging expressing interest in continued receipt of the broadcast content, the further messaging containing election between the point-to-point call and the broadcast content should network resources be unable to conduct both concurrently;
      waiting for signaling from the network to complete the point-to-point call.

3. A wireless mobile station for use in a wireless communications network, comprising:
   a transceiver;
   a speaker;
   a microphone;
   a user interface;
   a manager, coupled to the transceiver, speaker, microphone, and display, and programmed to perform operations comprising:
      receiving network notification of an incoming point-to-point call from a remote station while the mobile station is receiving broadcast content via a multi-user forward-link broadcast channel;

soliciting operator input as to whether to accept or reject the incoming call;

if the operator rejects the call, sending the network notification of rejection;

if the operator accepts the call, sending the network notification of acceptance and performing further operations comprising:

determining call handling preferences as to prescribed categories of operating conditions including at least the following: (1) whether to continue receiving the broadcast content, (2) election between the point-to-point call and the broadcast content should network resources be unable to conduct the point-to-point call and broadcast content concurrently;

sending the network further messaging stating the determined call handling preferences, and waiting for signaling from the network to complete the point-to-point call.

4. A wireless mobile station for use in a wireless communications network, comprising:

transceiver means for wireless transmitting and receiving signals;

speaker means for producing audio output from electrical input;

microphone means for producing audio output from electrical input;

user interface means for converting human input to machine-readable input and converting machine-readable output to human-readable output;

manager means, coupled to the transceiver means, speaker means, microphone means, and user interface means, for performing operations comprising:

receiving network notification of an incoming point-to-point call from a remote station while the mobile station is receiving broadcast content via a multi-user forward-link broadcast channel;

soliciting operator input as to whether to accept or reject the incoming call;

if the operator rejects the call, sending the network notification of rejection;

if the operator accepts the call, sending the network notification of acceptance and performing further operations comprising:

determining call handling preferences as to prescribed categories of operating conditions including at least the following:

(1) whether to continue receiving the broadcast content, (2) election between the point-to-point call and the broadcast content should network resources be unable to conduct the point-to-point call and broadcast content concurrently;

sending the network further messaging stating the determined call handling preferences, and waiting for signaling from the network to complete the point-to-point call.

* * * * *